United States Patent [19]

Yagasaki et al.

[11] Patent Number: 5,220,623
[45] Date of Patent: Jun. 15, 1993

[54] IMAGE PROCESSING APPARATUS WHICH CAN SHIFT REPRODUCTION POSITION OF IMAGE AREAS, CHARACTER TRAIN, ETC.

[75] Inventors: Toshiaki Yagasaki, Hino; Shunji Nakamura, Kawasaki; Kimio Nakahata, Kawasaki; Mitsuru Kurata, Kawasaki; Kazuotshi Shimada, Kawasaki; Toshiro Matsui, Kawasaki, all of Japan

[73] Assignee: Canon Kabushiki Kaisha, Tokyo, Japan

[21] Appl. No.: 795,309

[22] Filed: Nov. 21, 1991

Related U.S. Application Data

[63] Continuation of Ser. No. 298,836, Jan. 18, 1989, abandoned, which is a continuation of Ser. No. 947,426, Dec. 29, 1986, abandoned, which is a continuation of Ser. No. 664,307, Oct. 24, 1984, abandoned.

[30] Foreign Application Priority Data

Nov. 2, 1983 [JP] Japan .................. 58-206448
Nov. 2, 1983 [JP] Japan .................. 58-206449

[51] Int. Cl.⁵ .............................. G06K 9/00
[52] U.S. Cl. .............................. 382/45; 382/48; 382/57
[58] Field of Search .................. 382/9, 45, 48, 57; 400/3, 63, 76, 279; 355/40; 395/150, 151; 340/723

[56] References Cited

U.S. PATENT DOCUMENTS

| | | | |
|---|---|---|---|
| 3,295,105 | 12/1966 | Gray et al. | 382/48 |
| 3,483,527 | 12/1969 | Terry | 364/523 |
| 3,760,376 | 9/1973 | Tanner | 364/523 |
| 3,837,459 | 9/1974 | Martin | 400/63 |
| 4,087,852 | 5/1978 | Campbell et al. | 400/279 |
| 4,447,888 | 5/1984 | Kuecker | 364/900 |
| 4,558,461 | 12/1985 | Schlang | 382/46 |
| 4,687,353 | 8/1987 | DeGeorge et al. | 400/279 |
| 4,741,045 | 4/1988 | Denning | 382/48 |

*Primary Examiner*—Leo H. Boudreau
*Attorney, Agent, or Firm*—Fitzpatrick, Cella Harper & Scinto

[57] ABSTRACT

An image processing apparatus includes a read unit for reading image information from an original text, a detection unit for detecting position information of the image information, and a conversion unit for converting the position information in accordance with the output of the detection unit.

10 Claims, 6 Drawing Sheets

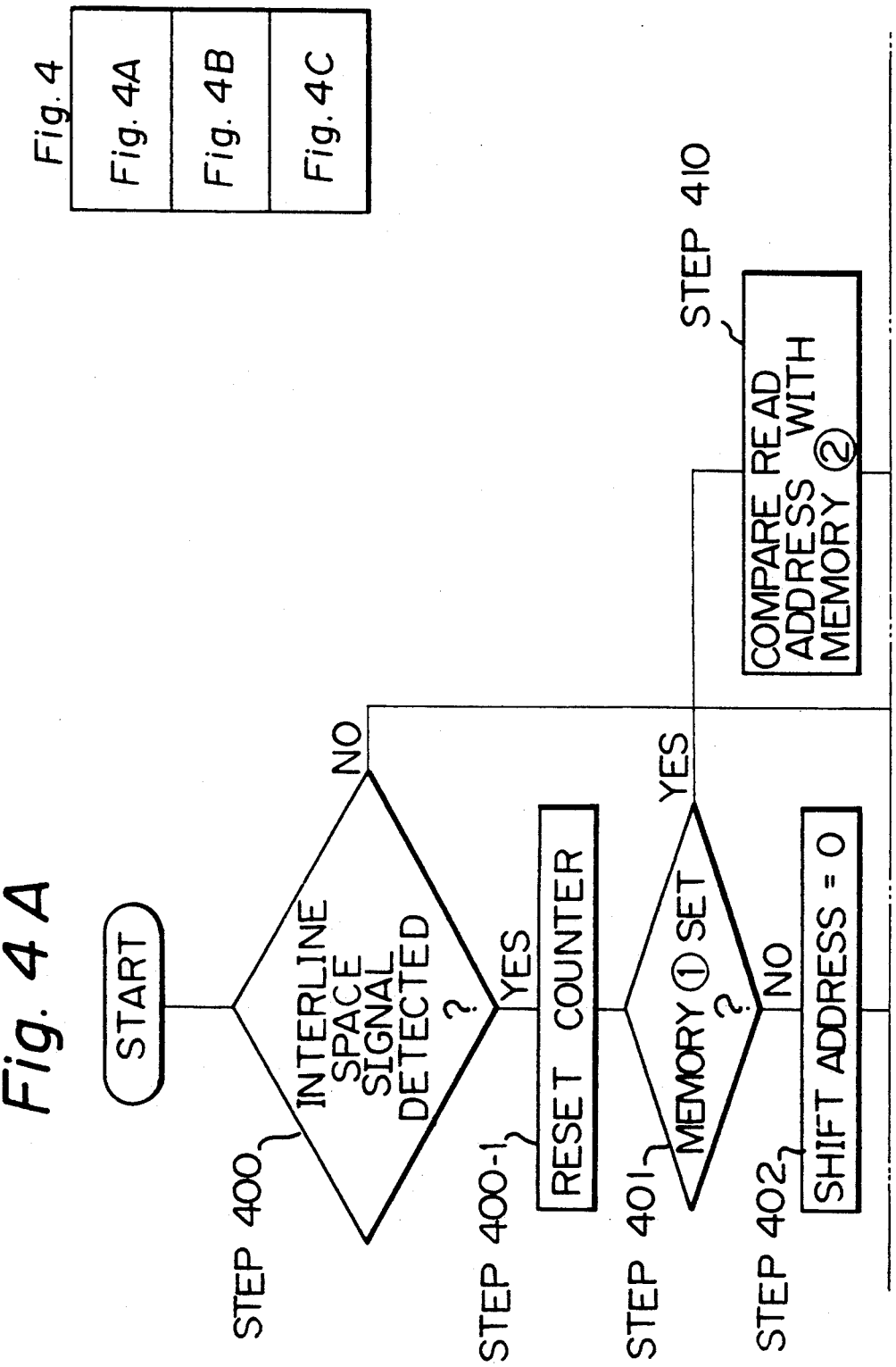

IMAGE PROCESSING APPARATUS WHICH CAN SHIFT REPRODUCTION POSITION OF IMAGE AREAS, CHARACTER TRAIN, ETC.

This application is a continuation of application Ser. No. 07/298,836 filed Jan. 18, 1989, which is a continuation of Ser. No. 06/947,426, filed Dec. 29, 1986, which is a continuation of Ser. No. 06/664,307, filed Oct. 24, 1984, all now abandoned.

BACKGROUND OF THE INVENTION

1. Field of the Invention

The present invention relates to an image processing apparatus having an image processing function.

2. Description of the Prior Art

In a prior art image processing apparatus which outputs image information read by a reader unit, by an output unit such as a laser beam printer, it is a basic requirement to reproduce an original image with a high fidelity. Special functions included are magnification, trimming and image shifting. Such functions, however, are functions which relocate a portion or all of the input data with a desired magnification. For a hand-written document, the start positions of respective lines are not aligned. Accordingly, a copied image is not easy to read.

SUMMARY OF THE INVENTION

It is an object of the present invention to provide an improved image processing apparatus.

It is another object of the present invention to provide an image processing apparatus capable of reproducing an easy-to-read image.

It is another object of the present invention to provide an improvement in image shifting.

It is another object of the present invention to provide an image processing apparatus capable of reproducing an easy-to-read image by adjusting the character start position of respective lines in a hand-written documents.

It is another object of the present invention to provide an image processing apparatus capable of aligning the character start positions of the character lines.

It is another object of the present invention to provide an image processing apparatus capable of aligning the character start positions of the paragraphs.

According to the present invention, the foregoing objects are attained by providing an image processing apparatus having means for recognizing areas of an original in accordance with an image signal generated by a read means, means for detecting position information having a value indicative of the position of each area so recognized, and means for correcting output data used in reproducing a predetermined area, in accordance with the value of the position information. The correcting means corrects the output data such that each reproduced image corresponding to the predetermined area is shifted in parallel. Alternatively, the recognizing means may be for recognizing character trains as an image, line by line, in accordance with the image signal, and means may be provided for aligning the start positions of the lines to predetermined positions in accordance with the detected position information.

Other objects of the present invention will be apparent from the following description of the invention and the appended claims.

DETAILED DESCRIPTION OF THE PREFERRED EMBODIMENTS

Figure 1:
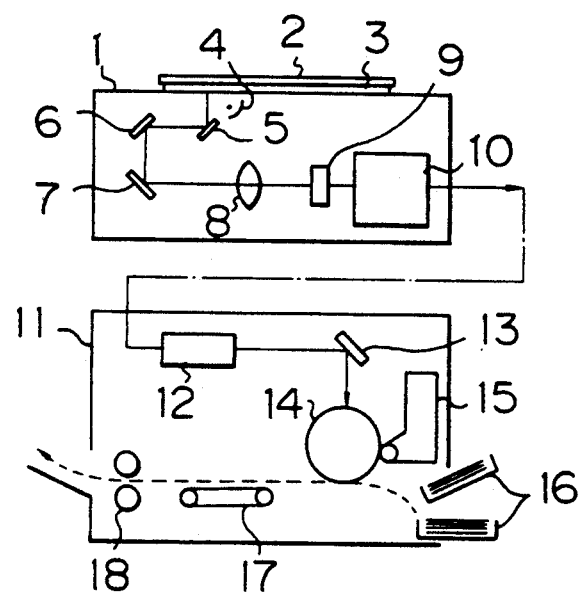
FIG. 1 is a sectional view of an apparatus embodying the present invention.

FIG. 1 shows a construction of one embodiment of the present invention. Numeral 1 denotes a reader for reading image information of an original sheet and processing it, numeral 2 denotes an original sheet cover for processing the original sheet, numeral 3 denotes a platen on which the original sheet is mounted, numeral 4 denotes an exposure lamp for illuminating the original sheet, numerals 5-7 denote mirrors for directing the exposed image, numeral 8 denotes an imaging lens for imaging the exposed image, numeral 9 denotes a photosensor (line sensor) for digitally reading the image information, numeral 10 denotes an image processing unit for processing the image read by the photosensor 9, and numeral 11 denotes an output unit (printer) for outputting the image information sent from the reader 1. In the present embodiment, the output unit 11 is a laser beam printer which can print out not only the information from the reader 1 but also information from an external source. Numeral 12 denotes a laser scanner for converting the image information read by the reader 1 to a laser beam, numeral 13 denotes a mirror for reflecting the laser beam to direct it to a photoconductor drum 14, numeral 15 denotes a developing unit for developing a latent image formed on the photoconductor drum 14, numeral 17 denotes a convey belt for conveying record paper from a paper cassette 16, and numeral 18 denotes a paper ejection roller for ejecting the record paper.

In this apparatus, the original sheet cover 1 is lifted up, the original sheet is mounted on the transparent platen, the original sheet is scanned by the optical system comprising the exposure lamp 4, the mirrors 4-7 and the lens 8 and the image information is sequentially read by the line sensor 9. A resolution of the line sensor may be 10 bits 1 mm for a hand-written character although it may vary with the size of the character. Of course, a higher resolution is acceptable. The read image information is processed by the image processing unit 10. The output unit 11 modulates a laser beam with the signal from the image processing unit 10 and the laser beam is scanned by the laser scanner 12 and exposed onto the uniformly charged photoconductor drum 14. After developing and transferring, the image is outputted.

Figure 2A:
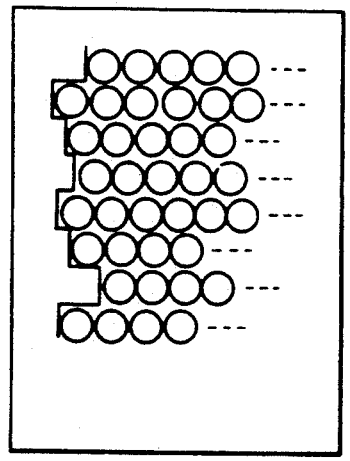
FIGS. 2A and 2B show examples of output produced by the present apparatus.
Figure 2B:
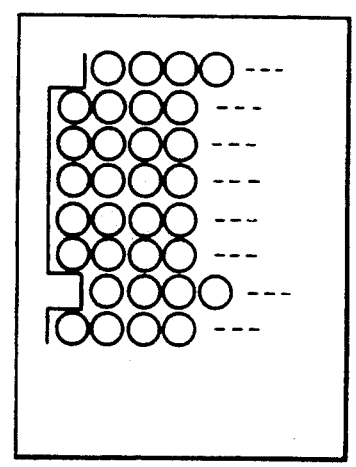

FIG. 2, consisting of FIGS. 2A and 2B, shows hand-written texts before and after processing by the present apparatus. Circles indicate characters, and FIG. 2A shows the original text and FIG. 2B shows a copy after processing by the present apparatus. In FIG. 2A, character start positions of character lines are not aligned, but in FIG. 2B, which shows the copy after the processing, the character start positions except paragraph start positions are aligned. The character start position at the beginning of each paragraph is aligned with the character start position of the first paragraph.

Figure 3:
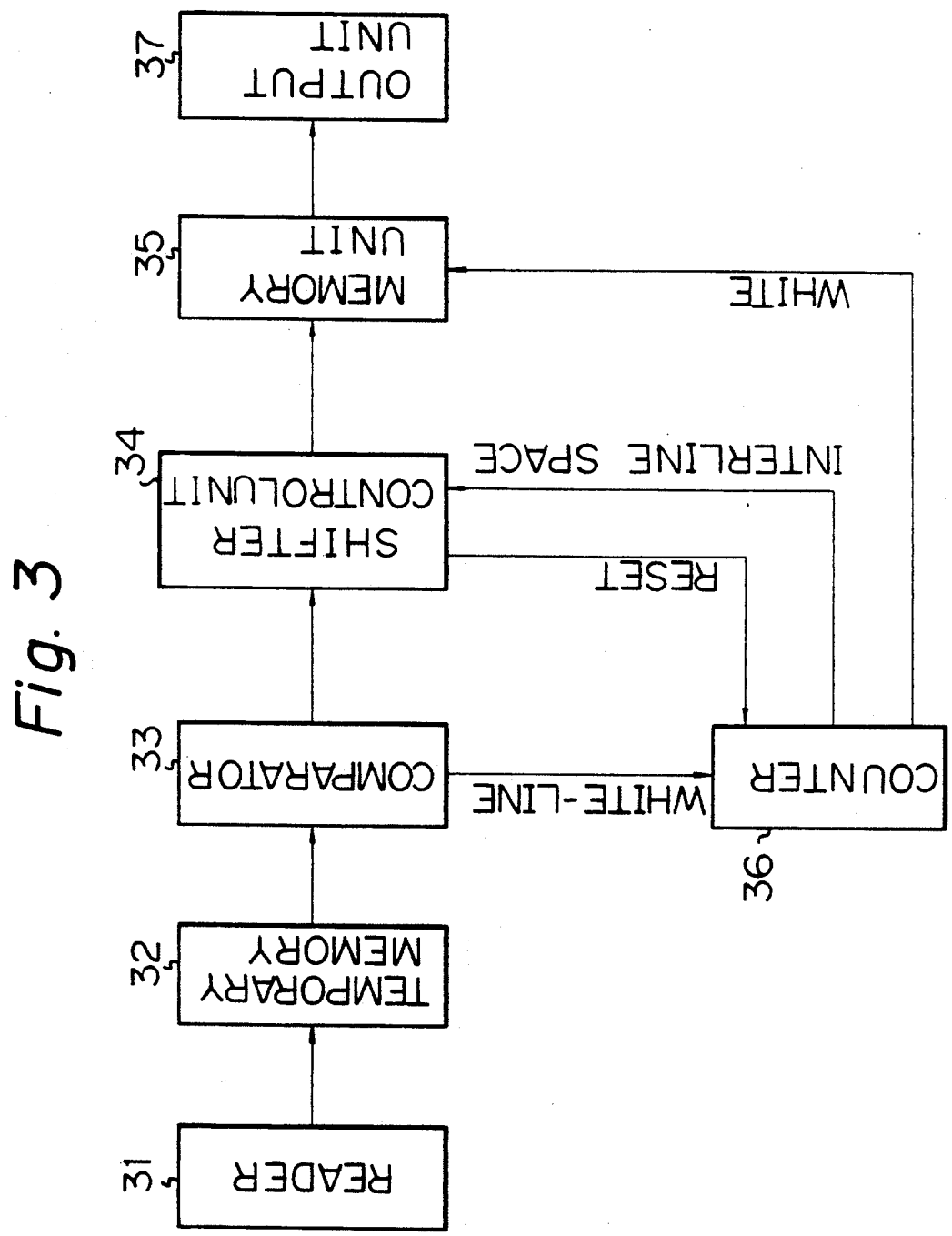
FIG. 3 is a block diagram of the present apparatus.

The above processing method is now explained in detail with reference to a block diagram shown in FIG. 3. An optical system of a reader 31 scans the original sheet so that the line sensor sequentially reads the original sheet. A temporary memory 32, a comparator 33, a shifter control unit 34 and a memory unit 35 constitute image processing unit. The image data read by the line sensor is temporarily stored in the temporary memory (buffer memory) 32. The image data is binarized by the comparator 33. into white signal (0) and black signal (1). If all of one line of data read by the line sensor are white, that is, if no character is included in a line read by the line sensor, the image data is handled as a white line and the counter 36 is advanced. If the white lines continue and the count of the counter 36 reaches a predetermined value, that is, if no character is included in the predetermined number of lines, it is determined or identified as an interline space, and the counter 36 produces an interline space signal and then the counter 36 is reset. The interline space signal is produced when a first black line is detected after the predetermined number of white lines were detected. If the black signal (black pattern) is detected before the predetermined number of white lines have been detected, the shifter control unit 34 resets the counter 36 by the black signal (reset signal) and the data of the white lines already read is handled as a portion of the character signal. The white signal is supplied to the memory unit 35. When the counter 36 detects the interline space, a white signal of a predetermined value is supplied to the memory unit 35 in order to form the interline space, and the interline space signal is supplied to the shifter control unit 34 in order to control the character start position of the black signal to be next detected. If the comparator detects the black signal, the black signal is supplied to the shifter control unit to control the character start position.

In a text which uses a ruled line form, the interline space may be detected when the comparator continuously produces the black signals through the binarization process. Normally, the black signal is not continuous because of spaces between characters in a character line, but the black signal is continuous for a ruled line. Accordingly, the interline space can be detected by checking the continuity of the black signal.

Figure 4B:
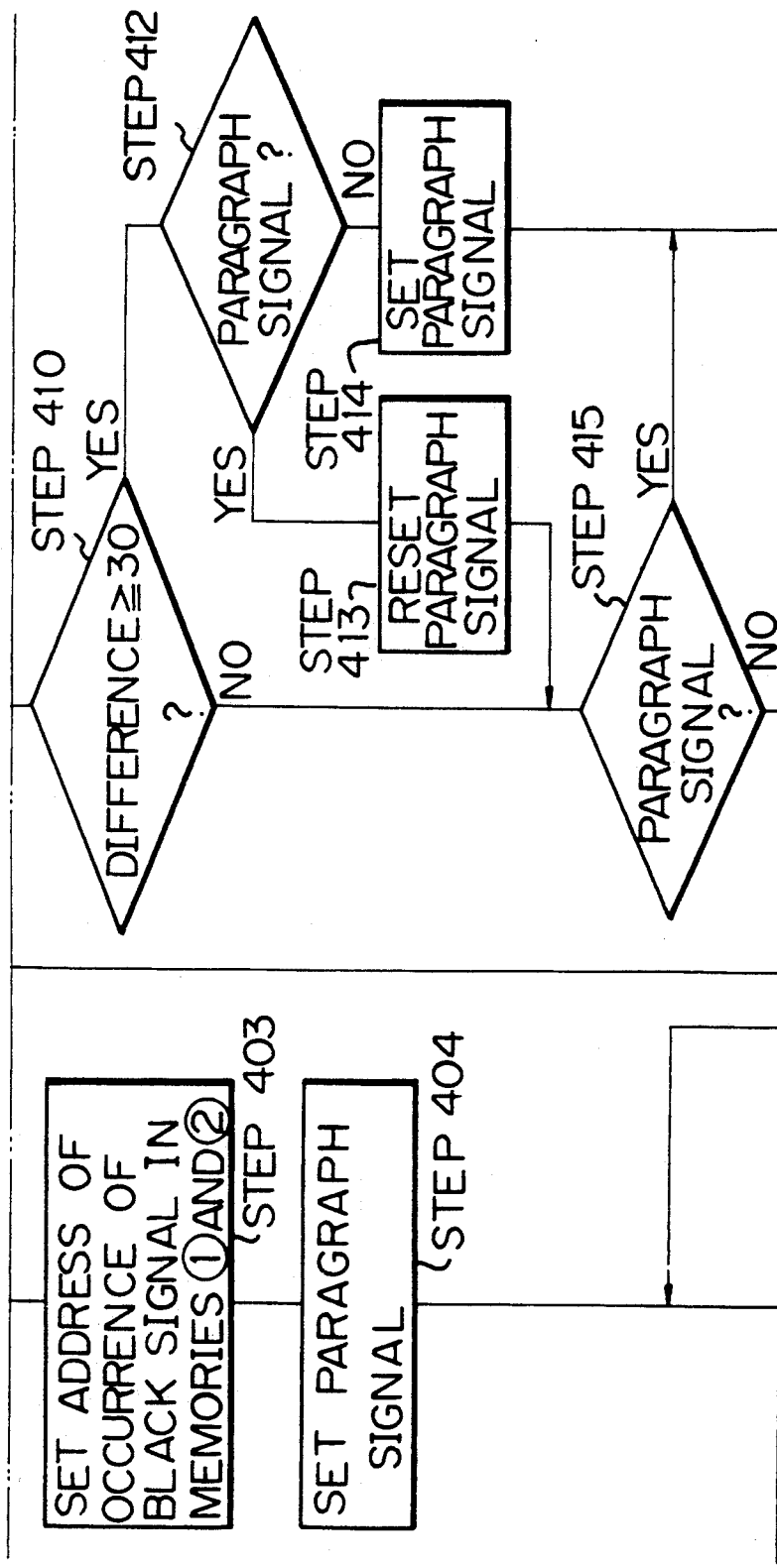
FIG. 4, consisting of FIGS. 4A, 4B and 4C, is a flow chart for a shifter control unit in FIG. 3, FIGS. 5A and 5B illustrate paragraphing.
Figure 4C:
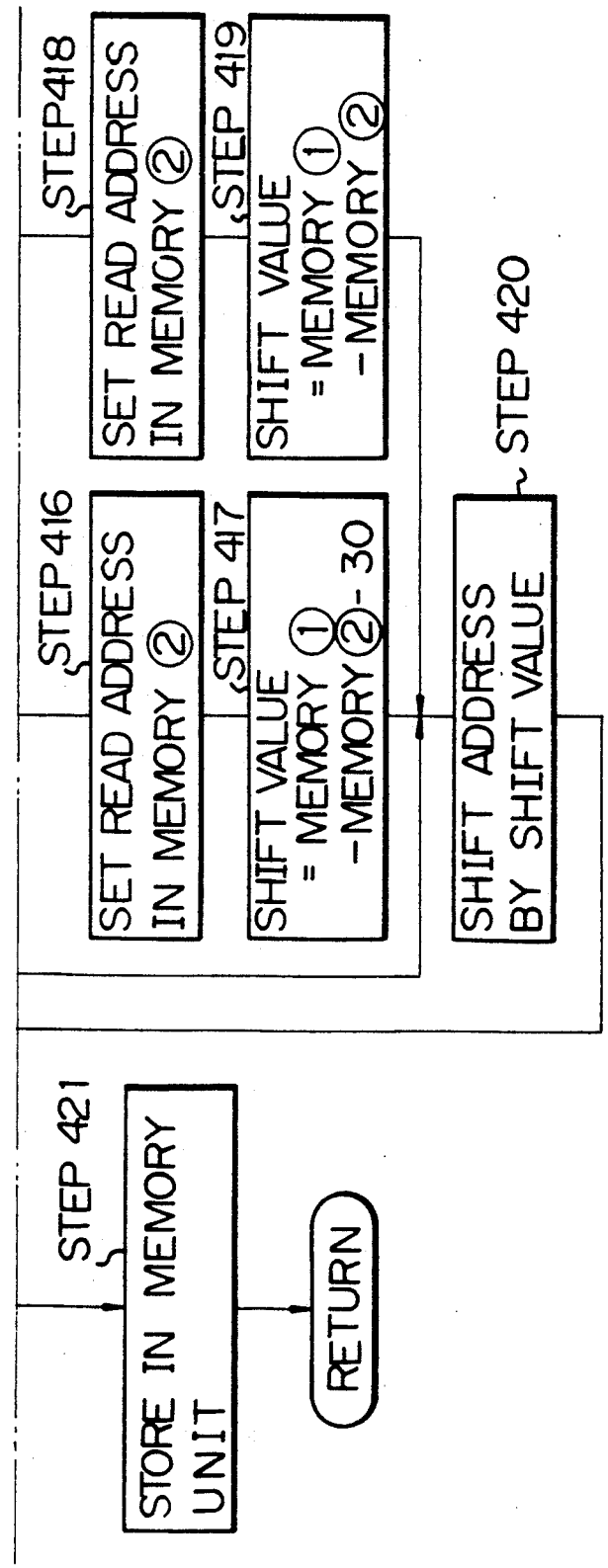
Figure 5A:
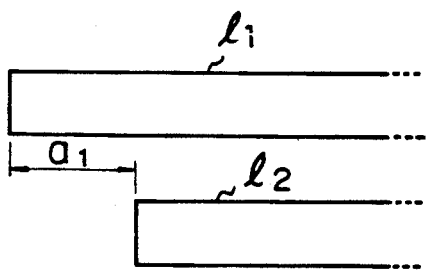
Figure 5B:
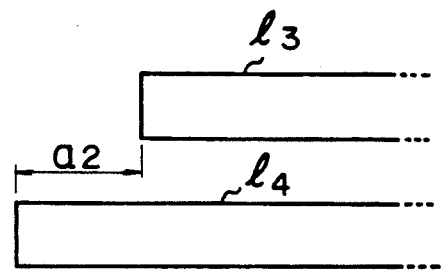
Figure 6:
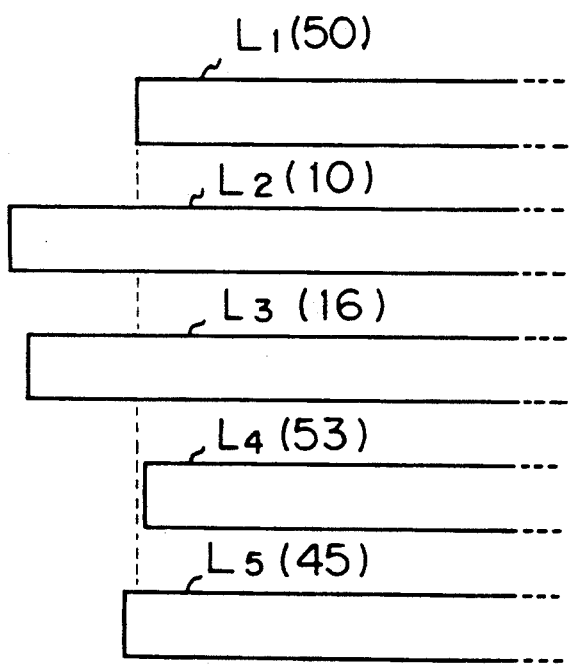
FIG. 6 is a diagram for explaining character start position control.

The operation of the shifter control unit 34 is explained with reference to the flow chart of FIG. 4. The shifter control unit 34 sets the character start position. In a step 400, the interline space signal generated between character lines of the text is monitored, and if it is generated, the counter 36 is reset in a step 400-1. When the interline space signal is generated, it is regarded as the start of the character line because the first character in the first line of the text is frequently preceded a space. In a step 401, whether the line is the first line of the text or not is checked. It is determined by whether a memory ①to be described later has been set or not. The memory ① stores an address of the character start position in the first line, and it is initially reset. If the line is the first line, the memory ① has not been set and the program proceeds to a step 402 where a shift address is set to "0". The shift address indicates the number of shifts for the character line in order to align the start position of the character line to a reference position. The first line is the beginning of a paragraph and the character start position of the first paragraph is used as the reference position. Accordingly, the shift value is "0". In a step 403, the character start position in the first line, that is, the address of the position at which the black signal is generated is stored in the memories ① and ②. This address is determined by the bit number of the line sensor at which the black signal is read. The memory ② stores an address of the character start position of the line read by the line sensor. Paragraphing can be detected by checking the addresses of the character start positions of two adjacent read lines. In the read line of the first line, the contents of the memories ① and ② are equal. The memories ① and ② are a RAM (not shown) in the shifter control unit 34. In a step 404, paragraphing is detected because of the read line of the first line of the text, and a paragraph signal is set. So far, because of initial operation, the black signal address (memories ① and ②) does not change, and the image data is stored in the memory unit 35 in a step 421. If the memory ① has been set when the next interline space signal is read, the program proceeds to a step 410 where the address of the current character start position and the address of the previous character start position stored in the memory ② are compared. In a step 411, whether a difference between those addresses is no less than thirty or not is checked. The number thirty corresponds to one character space when the characters are scanned at a resolution of 30 bits/character. If the difference is no less than thirty, it is regarded as one character space which represents the beginning of paragraph (FIG. 5A) or the second line of a paragraph (FIG. 5B). In FIG. 5, $l_1$-$l_4$ represent lines in the text, and $a_1$ and $a_2$ represent differences between the character start address of $l_1$ and $l_2$, and $l_3$ and $l_4$, respectively. The number thirty need not be fixed but may be changed depending on the resolution of the line sensor or the size of character. Let us assume a text as shown in FIG. 6, $L_1$-$L_5$ representing lines in the text and numerals in parentheses indicating the character start addresses of the respective lines. Assuming that $L_1$ is the first line, the character start address 50 of the line $L_1$ is stored in the memories ① and ②. For the line $L_2$, the difference between the address read and the content of the memory ② is 50−10=40, which is not less than 30. Thus, the program proceeds to the step 412 where the paragraph signal is checked. For the line $L_1$, the paragraph signal has already been set in the step 404. Therefore, the program proceeds to a step 413 where the paragraph signal is reset. In a step 415, the paragraph signal is checked. Since the paragraph signal was reset in the step 413, the program proceeds to a step 416 where the character start address "10" of the line $L_2$ is stored in the memory ②. In a step 417, a shift value=-memory ① −memory ②=30 is calculated to align the character start positions, and in a step 420, the line is shifted by the calculated shift value. In the present example, the shift value is 50−10−30=10, and the line is shifted right by 10 addresses assuming that the leftmost position is address 0. For the line $L_3$, the address difference in the step 411 is |10−16|=6, which is less than 30. Thus, the program proceeds to the step 415. Since the paragraph signal was reset in the line $L_2$, the program proceeds to the steps 416 and 417 and the shift value is 50−16−30=4. For the line $L_4$, the address difference in the step 411 is |16−53|=37, which is not less than 30. Thus, the program proceeds to the step 412. Since the paragraph signal was reset in the lines $L_2$ and $L_3$, the program proceeds to the step 414 where the paragraph signal is set, and proceeds to the steps 418 and 419. In paragraphing, the shift value is memory ①−memory ②=50−53=−3, and the line is shifted left by three addresses. When the paragraphing continuously occurs over two or more lines like lines $L_4$ and $L_5$, the address difference in the step 411 is 53−45=8, which is less than 30. Thus, the program proceeds to the step 415. Since the paragraph signal was set in the line $L_4$, the program proceeds to the steps 418 and 419, and the shift value is 50−45=5. In this manner, once the character start position is decided, the shift value determined in the step 417 or 419 is kept unchanged until the interline space signal is subsequently generated so that the character start positions are aligned.

In this manner, the text with its character start positions aligned is stored in the memory unit 35 (image memory) for each line and outputted by the output unit 37 (e.g., L.B.P.). The alignment of the character start position is one of the functions of the image processing apparatus, and other conventional functions such as copying and magnification can also be performed.

Instead of storing in the image memory the text data having the character start positions aligned, the output timing for reading out each line from the image memory may be changed to align the character start positions of the character lines.

The text data may be stored in the memory and the above processing may be effected while the data is read out of the memory.

By adding a character pattern recognition unit, the character lines of the text may be read character by character and encoded, and corresponding characters may be retrieved from a KANJI ROM so that a typed character text is produced. In this manner, the handwritten characters are printed by the type characters. A Gothic font, Mincho font or any other font may be selected as required.

By adding a skew detector for the text, coordinates of the text can be corrected even if the text skews, and the above processing can be properly carried out.

As described hereinabove, according to the present invention, since the character lines of the image information are checked to control the character start positions of the character lines, the easy-to-read copy is provided. When a writer composes a test, he or she need not pay attention to the character start position and an aligned text is reproduced in the copy. Accordingly, an efficiency in preparing the text is improved.

The present invention is not limited to the illustrated embodiments but various modifications may be made within the scope of the appended claims.

What we claim is:

1. An image processing apparatus comprising:
   reading means for reading an image of an original and outputting an image signal;
   detection means for detecting positions of characters which are respectively at the heads of a plurality of character trains in said original;
   processing means for processing the image signal output from said reading means to cause a position of each character train to be shifted according to the detected position of the character which is at the head of each character train;
   image forming means for forming an image on a recording medium; and
   selecting means for selecting one of first mode in which the image of the original, read by said reading means, is processed by said processing means and said image forming means forms an image corresponding to the processed image signal, and a second mode in which said image forming means forms the image of the original, read by said reading means, without a processing of the read image by said processing means.

2. An image processing apparatus according to claim 1, wherein said processing means processes the image signal to cause the position of each character train to be independently shifted.

3. An image processing apparatus according to claim 1, wherein said image forming means includes:
   a photosensitive member;
   latent image forming means for forming a latent image on said photosensitive member; and
   development means for developing said latent image.

4. An image processing apparatus according to claim 1, wherein said detection means detects the position of a character which is at the head of each character train, according to the image signal output from said reading means.

5. An image processing apparatus according to claim 1, wherein said processing means compares the positions of the characters which are respectively at the heads of two adjacent character trains, and sifts the character train according to the result of the comparison.

6. An image processing apparatus according to claim 1, wherein said processing means includes a memory for storing an image representing character trains, and shifts the character train by changing a storage address in said memory.

7. An image processing apparatus according to claim 1, wherein said processing means includes a memory for storing an image representing character trains, and shifts the character train by changing a timing of an output of the image representing the character trains from said memory.

8. An image processing apparatus according to claim 5, wherein said processing means shifts the last one of two adjacent character trains to a first position when a position of a character which is at the head of the last one of said two character trains is recessed by an amount more than a predetermined amount from a position of a character train which is at the head of the preceding one of the two character trains, and shifts the last one of said two adjacent character trains to a second position when the position of the character which is at the head of the last one of said two character trains is recessed by an amount less than the predetermined amount.

9. An image processing apparatus comprising:
   reading means for reading an image of an original and outputting an image signal;
   detection means for detecting positions of characters which are respectively at the heads of a plurality of character trains described in said original;
   conversion means for recognizing patterns of characters described in the original and converting the recognized patterns of characters into character code signals;
   a memory which stores font data of characters, said memory having a plurality of font data of different font styles with respect to the same character;
   decision means for determining a shift-position of each character train according to the position of the character which is at the head of each character train detected by said detection means;
   processing means for reading out the font data of a desired style from said memory according to the character code signal of the characters of each character train converted by said conversion means, and for performing processing so that images of said font data of the desired style of the characters are formed at the shift-position determined by said decision means.

10. An image processing apparatus comprising:

reading means for reading an image of an original;

conversion means for recognizing patterns of characters read by said reading means, one character by one character, and for converting the patterns of characters recognized into character code data;

generation means for generating an image pattern corresponding to the character code data converted by said conversion means, said generation means generating a plurality of image patterns of different font styles for the same character;

image forming means for forming an image by replacing the characters present in said original with the image patterns of a desired style generated by said generation means;

processing means for shifting a position of the image pattern of the desired style formed by said image forming means to a position of a character present in said original according to a position of a character which is at the head of each of a plurality of character trains present in said original.

* * * * *

UNITED STATES PATENT AND TRADEMARK OFFICE
CERTIFICATE OF CORRECTION

PATENT NO. : 5,220,623

DATED : June 15, 1993

INVENTOR(S) : TOSHIAKI YAGASAKI, ET AL.

It is certified that error appears in the above-indentified patent and that said Letters Patent is hereby corrected as shown below:

On the title page:

[54] IN THE TITLE

"TRAIN," should read --TRAINS,--.

[75] INVENTORS

"Toshiaki Yagasaki, Hino" should read
--Toshiaki Yagasaki, Tokyo--.

"Kazuotshi Shimada" should read
--Kazutoshi Shimada--.

[56] REFERENCES CITED
ATTORNEY, AGENT OR FIRM

"Fitzpatrick, Cella Harper & Scinto" should read
--Fitzpatrick, Cella, Harper & Scinto--.

COLUMN 1

Line 4, "TRAIN," should read --TRAINS,--.
Line 41, "ments." should read --ment.--.

UNITED STATES PATENT AND TRADEMARK OFFICE
CERTIFICATE OF CORRECTION

PATENT NO. : 5,220,623
DATED : June 15, 1993
INVENTOR(S) : TOSHIAKI YAGASAKI, ET AL.

It is certified that error appears in the above-indentified patent and that said Letters Patent is hereby corrected as shown below:

COLUMN 2

Line 43, "cover 1" should read --cover 2--.
    Line 46, "mirrors 4-7" should read --mirrors 5-7--.

COLUMN 3

Line 12, "comparator 33." should read --comparator 33--.

COLUMN 5

Line 17, "position" should read --positions--.
    Line 43, "test," should read --text,--.
    Line 64, "first" should read --a first--.

COLUMN 6

Line 23, "sifts" should read --shifts--.

COLUMN 8

Line 7, "means;" should read --means; and--.

Signed and Sealed this

Twenty-sixth Day of April, 1994

Attest:

BRUCE LEHMAN

*Attesting Officer*      *Commissioner of Patents and Trademarks*